United States Patent [19]
Coverdale et al.

[11] Patent Number: 5,809,414
[45] Date of Patent: Sep. 15, 1998

[54] USER OUT-OF-RANGE INDICATION FOR DIGITAL WIRELESS SYSTEMS

[75] Inventors: Paul Vincent Coverdale; Wayne Raymond Getchell, both of Nepean, Canada

[73] Assignee: Northern Telecom Limited, Montreal, Canada

[21] Appl. No.: 561,687

[22] Filed: Nov. 22, 1995

[51] Int. Cl.$^6$ .................................................. H04B 7/00
[52] U.S. Cl. .......................................... 455/421; 455/403
[58] Field of Search ................................. 379/58, 59, 60, 379/61; 455/33.1, 54.1, 421; 370/253

[56] References Cited

U.S. PATENT DOCUMENTS

| | | | |
|---|---|---|---|
| 4,032,723 | 6/1977 | Mendoza | 455/421 |
| 4,853,951 | 8/1989 | Bauer | 455/421 |
| 4,930,149 | 5/1990 | Matsushima | 455/421 |
| 5,134,708 | 7/1992 | Marui | 455/421 |
| 5,283,784 | 2/1994 | Genter | 379/409 |
| 5,333,175 | 7/1994 | Ariyavisitakul | 379/58 |
| 5,371,783 | 12/1994 | Rose et al. | 379/61 |
| 5,373,548 | 12/1994 | McCarthy | 379/63 |
| 5,408,693 | 4/1995 | Alton et al. | 455/212 |
| 5,450,613 | 9/1995 | Takahara | 455/54.1 |
| 5,467,341 | 11/1995 | Matsukane | 370/253 |
| 5,471,650 | 11/1995 | Vexler | 455/421 |
| 5,490,286 | 2/1996 | Kah, Jr. | 455/421 |
| 5,491,834 | 2/1996 | Chia | 379/60 |
| 5,539,803 | 7/1996 | Bhat | 379/61 |
| 5,548,818 | 8/1996 | Sawyer | 455/33.1 |
| 5,550,893 | 8/1996 | Heidari | 455/33.1 |
| 5,644,620 | 7/1997 | Shimura | 455/421 |

FOREIGN PATENT DOCUMENTS

| | | | |
|---|---|---|---|
| 0 464 911 A2 | 1/1992 | European Pat. Off. | H04B 17/00 |
| 0 693 861 A2 | 1/1996 | European Pat. Off. | H04Q 7/32 |
| 8139663 | 11/1994 | Japan | H04B 7/26 |
| 2 257 332 | 1/1993 | United Kingdom | H04M 1/72 |

*Primary Examiner*—Dwayne D. Bost
*Assistant Examiner*—Myron K. Wyche
*Attorney, Agent, or Firm*—Jeffrey M. Measures

[57] ABSTRACT

A system for notifying users of digital wireless communications that a mobile unit is moving out of range and communication is about to be lost. The system inserts an audible indication as the received signal strength varies. The audible indication can be in the form of noise which is inserted in such a manner that a digital mobile unit mimics the behavior of an analog mobile unit which is moving out of range, in order to provide a readily identifiable indication to the user that the wireless handset is about to go out of range. Such a system can be used to indicate to both users of wireless units, and to telephone users which are in communication with wireless units, that communication is about to be lost.

8 Claims, 6 Drawing Sheets

USER OUT-OF-RANGE INDICATION FOR DIGITAL WIRELESS SYSTEMS

FIELD OF THE INVENTION

The present invention relates generally to digital wireless systems having out-of-range detection sub-systems.

BACKGROUND OF THE INVENTION

In analog wireless systems, as a mobile unit moves away from another wireless unit, the audio quality of the voice signal between the two units degrades gradually due to the reduction in the signal level as the mobile unit moves out of range. This produces increased noise, which acts as an audible indicator to the users that the mobile unit is gradually moving out of range.

In contrast, in digital wireless systems, due to the nature of digital transmissions, audio quality is maintained at a constant level despite variations in received signal level as the mobile node moves, provided the signal level is sufficient to enable the receiver to differentiate between "on" and "off" bits. However as the mobile unit moves to the limit of the receiver's sensitivity, the ability of the receiver to differentiate between "on" and "off" bits, and hence the audio quality, deteriorates rapidly. This can result in the receiver producing severely distorted speech, or even loud noise bursts in the user's ear, without any warning to the user.

U.S. Pat. No. 5,408,693 suggests automatically attenuating the output audio signals whenever a received signal strength indicator (RSSI) determines that the received signal strength is below a predetermined threshold. While this reduces the problem of a loud unexpected noise burst in the user's ear, there still exists a need for a system which will indicate to a user that communication may be lost suddenly in the middle of a conversation.

SUMMARY OF THE INVENTION

Therefore, it is an object of the present invention to provide a warning mechanism in a digital wireless system to notify users that a mobile unit is moving out of communication range.

One advantage of such a warning mechanism is to notify the user of mobile unit that the mobile unit is moving out of communication range, so that, if convenient, the user can cease moving out of range.

In accordance with one aspect of the present invention there is provided a wireless unit for use in a digital wireless telecommunications system, said wireless unit comprising:

means for receiving a digital signal;

means for determining a parameter measuring the transmission quality of said digital signal;

comparison and control means for evaluating whether said parameter satisfies a first criteria; and indicator means, responsive to said comparison and control means, for providing an indication that the received digital signal has failed to satisfy said first criteria.

In such a system, the parameter indicating signal transmission quality can be, for example, the RSSI, the BER (Bit Error Ratio), the carrier-to-noise ratio, the carrier-to-interference ratio, etc. The first criteria can be, for example, a simple threshold level which the received signal strength is to exceed in order to satisfy the criteria, or alternatively the first criteria can be the result of a decision tree evaluating a combination of parameters.

The indicator means can provide the user with a visual indication, an audible indication, or both. The audible indication can include tone, beeps, etc. For voice systems, in a preferred embodiment, the system inserts an audible indication, in the form of noise, as the received signal strength varies. The noise is inserted in such a manner that a digital mobile unit, which incorporates the preferred embodiment of the invention, mimics the behavior of an analog mobile unit which is moving out of range, in order to provide a readily identifiable indication to the user that the wireless handset is about to go out of range.

Preferably such a system can be used to indicate to both users of wireless units, and to telephone users which are in communication with wireless units, that communication is about to be lost. This is useful, for example, so that the two parties can wrap up their conversation in an orderly manner. Therefore, it is advantageous for such a warning mechanism to be included in a digital wireless units in general, wherein the wireless unit can be either a mobile unit, or a base station for communicating with mobile units and/or the PSTN. For example, the warning mechanism can be installed in a base station, so that when the base station receives a weakening signal from a mobile unit, the base station adds the audible indication to the voice signal which is then sent, for example, to the Public Switched Telephone Network (PSTN).

In accordance with another aspect of the present invention there is provided a method for providing an audible indication that a mobile digital wireless unit is moving out of communication range comprising the steps of:

a) receiving a digital signal;

b) determining a parameter measuring the transmission quality of said digital signal;

c) evaluating whether said parameter satisfies a first criteria; and, d) responsive to said parameter failing to satisfy said parameter, providing an audible indication that the received digital signal has failed to satisfy said first criteria.

BRIEF DESCRIPTION OF THE DRAWINGS

The present invention, together with further objects and advantages thereof will be further understood from the following description with reference to the drawings in which.

DETAILED DESCRIPTION OF THE PREFERRED EMBODIMENTS

Figure 1:
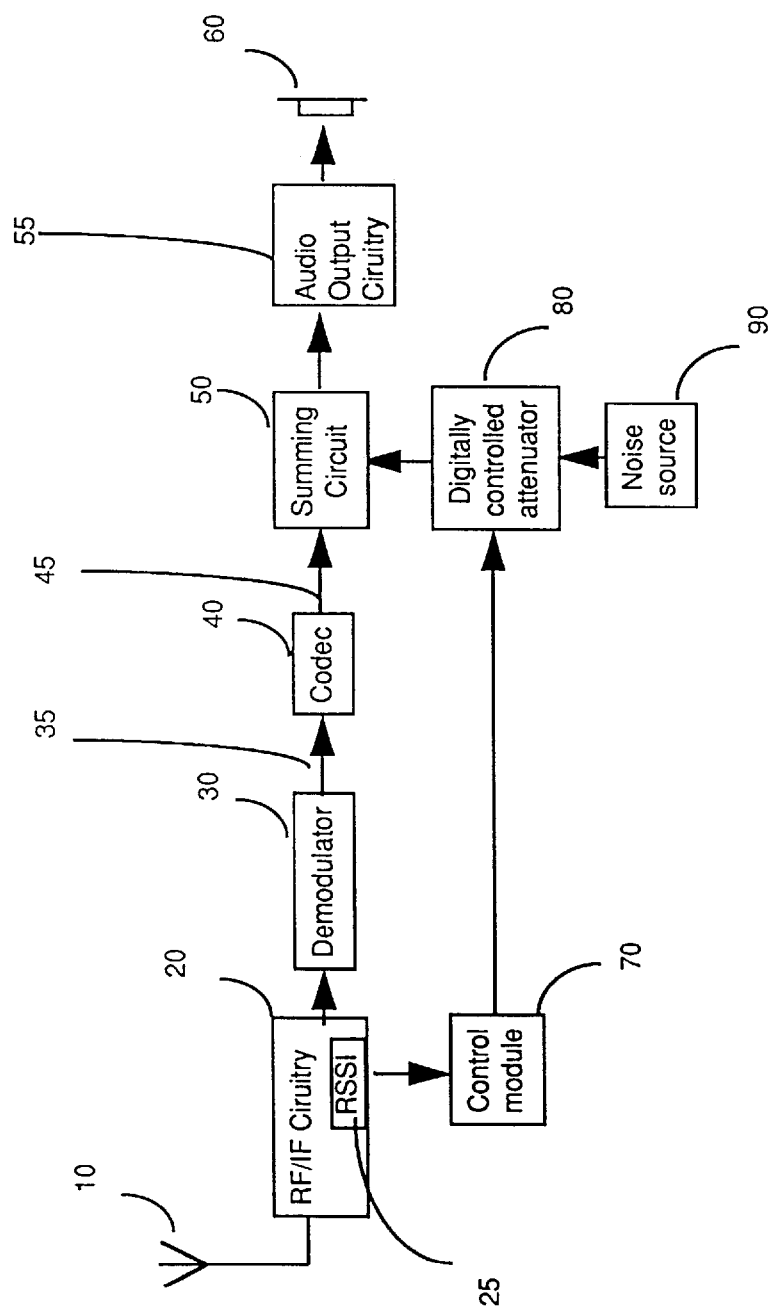
FIG. 1 is a block diagram illustrating a mobile unit incorporating an embodiment of the present invention.

A simplified block diagram of a mobile wireless unit incorporating an embodiment of the invention is shown in FIG. 1. Such a mobile unit has an antenna 10 for receiving radio frequency (RF) signals. The antenna 10 is connected to the RF/IF (radio frequency/intermediate frequency) circuitry 20. The RF/IF circuitry 20 includes conventional circuits for tuning the system to the desired RF channel and amplifying the incoming RF signal to a sufficient level.

The demodulator 30 demodulates the signal from the RF/IF circuitry in order to recover the digital bit-stream representing the encoded speech transported by the RF signal. A number of demodulation techniques can be used, depending on the particular digital wireless technique used to transmit the digital bit-stream. The demodulated digital bit stream, shown at 35, is then applied to the decoder portion of an appropriate CODEC 40 which decodes the signal and produces an analog signal corresponding to the original speech signal. In a conventional wireless unit, this analog speech signal 45 would then be sent to the unit's audio output circuitry 55, which controls the volume and sufficiently amplifies the signal 45 to drive the speaker of earpiece 70, as is known in the art. However, in the embodiment shown, the analog signal forms one input of a conventional summing circuit 50, as will be described hereinafter.

Meanwhile, the RF/IF circuitry 20, which includes Received Signal Strength Indication (RSSI) circuit 25, produces a signal representing the RSSI. Of course, as discussed, alternative parameters, e.g., the BER, could be measured instead of, or in addition to the RSSI. The RSSI is evaluated by a comparison and control module 60, the operation of which will be described with reference to FIGS. 2, 3 and 4. The output from the control module 60 is a control signal which controls the unit's indicator means for indicating to the user that the mobile unit is moving out of communication range. In the embodiment shown in FIG. 1, the comparison and control module 60 controls the digitally controlled attenuator circuit 56. The attenuator 56, for example an operational amplifier with digitally selectable feedback resistors, attenuates a noise signal produced by a noise source 58. The attenuated noise output from attenuator circuit 56 constitutes the other input to the summing circuit 52. The summing circuit 52 combines the attenuated noise with the analog signal 45 generated by the CODEC 40. The output of the summing circuit 52 is applied to the earpiece of the handset 70 in a conventional manner.

Figure 2:
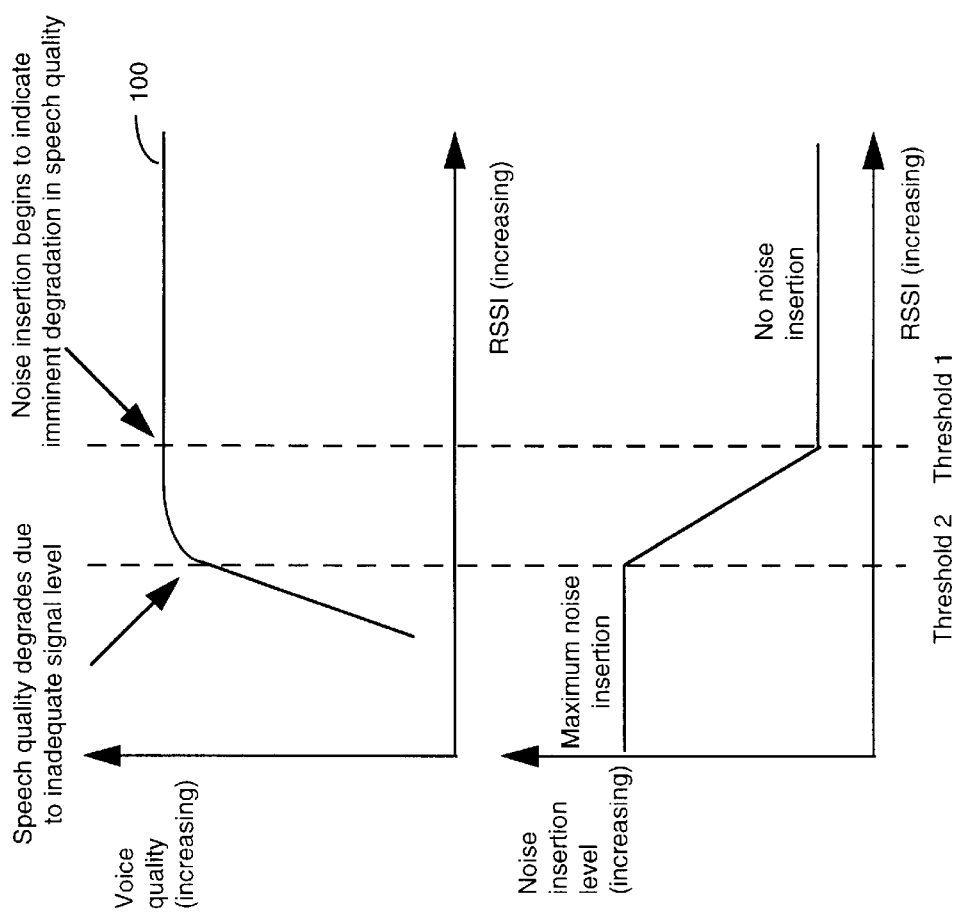
FIG. 2 is a graph illustrating how the speech quality of a received call decreases as the RSSI decreases, and the corresponding preferred levels of noise insertion.

Preferably, the indicator means inserts noise in such a manner that the unit produces audible output similar to that produced by an analog wireless unit as it moves out of range. An example showing when the noise should be inserted, and the level of noise insertion, is illustrated in FIG. 2. The upper diagram of FIG. 2 illustrates how voice quality varies typically with respect to RSSI in a digital wireless system. By viewing this diagram from the upper right corner to the lower left corner, this diagram illustrates how the voice quality of a received transmission, represented as curve 100, degrades as the RSSI decreases. To provide the out-of-range alerting indication, Threshold 2 is chosen as the value of RSSI where voice quality begins to degrade rapidly. Threshold 1 is then chosen as the value of RSSI at which the warning of imminent reduction in voice quality should start. This depends on the amount of warning desired prior to the connection becoming degraded. A suitable value for Threshold 1 is 10 dB higher than Threshold 2.

In operation of the embodiment shown in FIG. 1, a noise signal is produced constantly by the noise source 58 at the maximum insertion level. The lower diagram in FIG. 2 shows an example of the variation in the level of noise insertion as the value of RSSI crosses Thresholds 1 and 2. When the RSSI is greater than Threshold 1, the level of noise insertion is chosen to be just below the noise floor coming from the codec, so that there is effectively no noise insertion.

In other words, the attenuator 56 sufficiently attenuates the noise signal, so that effectively no noise is inserted. As a mobile unit moves away from a base station, the RSSI of the signal received by the mobile unit decreases. As the RSSI drops below Threshold 1, noise is gradually inserted (i.e., the degree of attenuation decreases), until the RSSI drops below Threshold 2, at which point the level of noise insertion is at the maximum desired level. A suitable value of noise insertion is 30 dB above the value corresponding to no noise insertion.

As shown in FIG. 1, the noise source 58 constantly generates a noise signal, which if not attenuated, will be sent to the summing circuit 52, and then to the earpiece 70, regardless of whether a call is in progress. As discussed, when no call is in progress, the noise signal produced by noise source 56 is effectively fully attenuated by attenuator 56. A switch (not shown) can be employed for turning the noise source on only when a call is in progress, or alternatively, only once the first threshold is reached. As an alternative (not shown), the attenuator can be replaced with an amplifier which amplifies a low power noise signal as needed in order to insert appropriate noise levels.

Furthermore, as another alternative, noise source 58 can produce a tone of a specific pitch, and the comparison and control module 60, in conjunction with a tone manipulation module (not shown) can vary the audible characteristics of the tone (e.g. the cadence, pitch, level) by, for example, a voltage controlled oscillator (not shown), in response to the extent the received signal fails to satisfy the first criteria.

Figure 3:
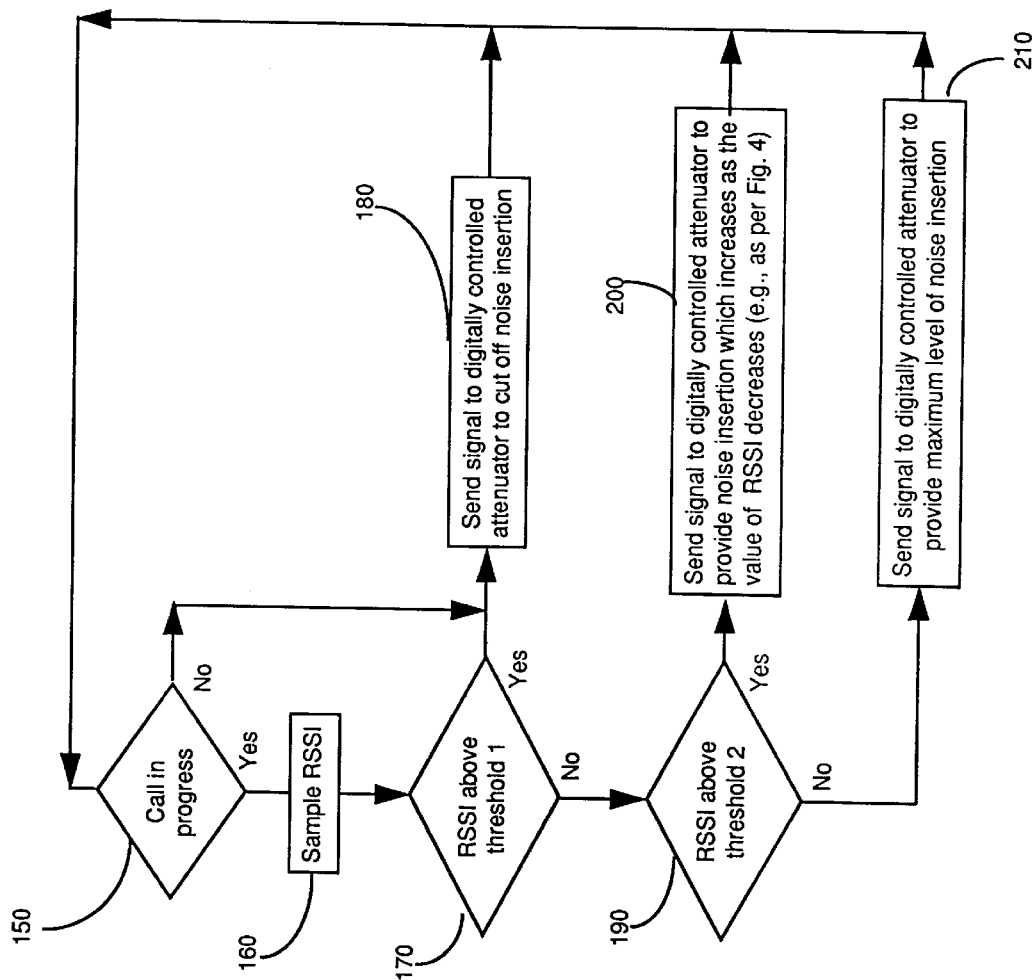
FIG. 3 is a flow chart illustrating the steps carried out by the embodiment of FIG. 1.

A simplified flow-chart illustrating the steps taken by the comparison and control module 20 incorporated within a cordless telephone in accordance with FIG. 1 is shown in FIG. 3. The first step 150 is to check whether a call is in progress, so as not to insert noise when the wireless handset is inactive. If a call is in progress, the RSSI is sampled, as shown at 160. Samples of RSSI are taken at short intervals (2 milliseconds is a suitable choice).

Either the value of the RSSI sample, or the average RSSI value taken over a short time period, is then compared to Threshold 1, as shown at 170. If the RSSI is above Threshold 1, according to the upper diagram in FIG. 2, a signal is sent to the digital attenuator to cut off the noise insertion, as shown at step 180. If the evaluation of the RSSI at step 170 determines that the RSSI is below Threshold 1, the system then determines whether the RSSI is above Threshold 2 at step 190.

Figure 4:
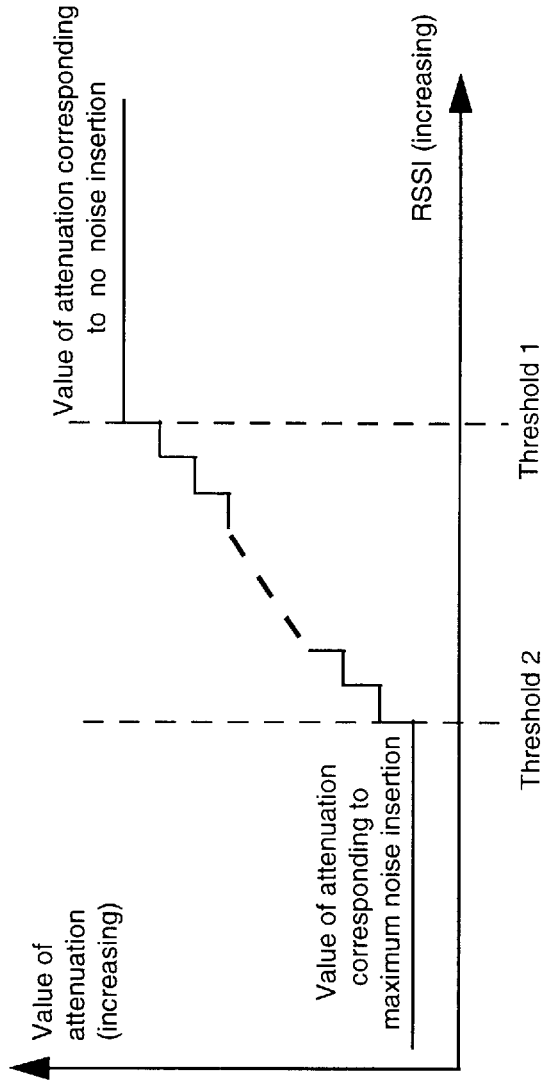
FIG. 4 is a graph illustrating the levels of noise inserted by one embodiment of the invention as the RSSI decreases.

If the RSSI is above Threshold 2, a signal is sent to the digital attenuator, as shown at step 200. Ideally, the system will provide a continuously variable level of noise insertion which increases as the RSSI level decreases from the level of threshold 1 to the level of threshold 2. The bottom part of FIG. 2 shows a possible relationship, where the level of noise insertion is inversely proportional to the RSSI between thresholds one and two. However, it is simpler, and in most cases satisfactory, for the control module 60 to send signals to the attenuator 56, in a series of steps as the RSSI decreases from Threshold 1 to Threshold 2, as shown in FIG. 4. In FIG. 4, each sub-range of RSSI corresponds to a discrete step of attenuation, i.e., a step in the noise insertion level. A suitable number of steps is 10.

If the value of RSSI (at step 190) is equal to or below Threshold 2, this indicates, according to the upper diagram of FIG. 2, that voice quality has likely already deteriorated, and a signal is sent to the digital attenuator to hold the level of noise insertion at its maximum value, as shown at step 210.

Alternatively, threshold 2 can be selected at some level intermediate threshold 1 and the level at which speech is likely to deteriorate. In this case, threshold 1 represents an initial level of warning, and threshold 2 would represent a second level of warning. In such a system, once the parameter (e.g., the RSSI) decreases below threshold 2, the audible characteristics of the audible indication is varied. For example, the slope of the noise insertion can be steepened, or a warning tone can be added to (and/or substituted for) the inserted noise, so that the user is notified that the mobile unit as moved even closer to the limit of communication range.

Figure 5:
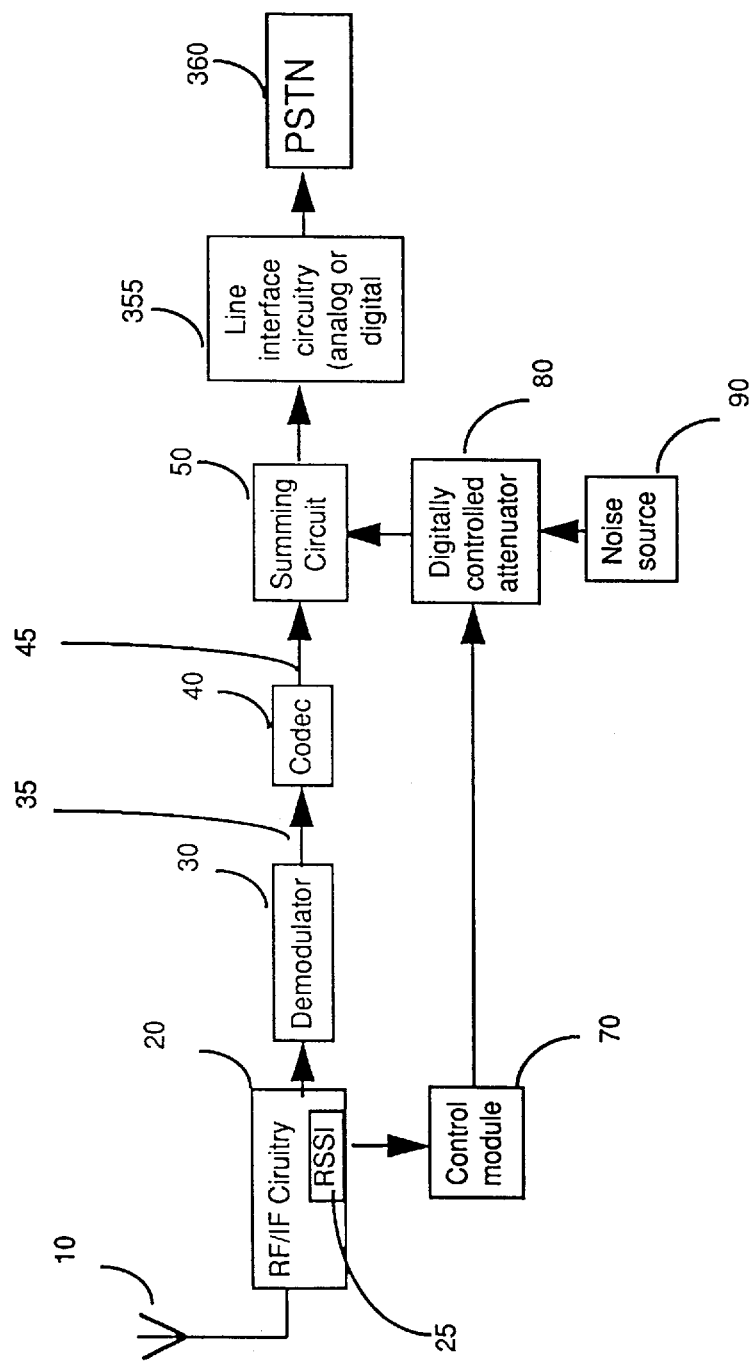
FIG. 5 is a block diagram illustrating an alternative embodiment of the invention, wherein the wireless unit is a base station connected to the PSTN.

FIG. 5 illustrates an embodiment of the invention incorporated within a base station. This embodiment is similar to that shown in FIG. 1, but wherein the output from the summing circuit 50 is sent to the base station's line interface circuitry 355, rather than the mobile unit's audio output circuitry 55. The line interface circuitry 355 forwards the output from summing circuit 50 (i.e., the voice signal plus inserted noise) to the PSTN. In this system, if a mobile unit moves out of range of a base station incorporating this embodiment, the person conversing with the mobile unit user will hear an audible indication (e.g., the inserted noise) that communication is about to be lost.

Figure 6:
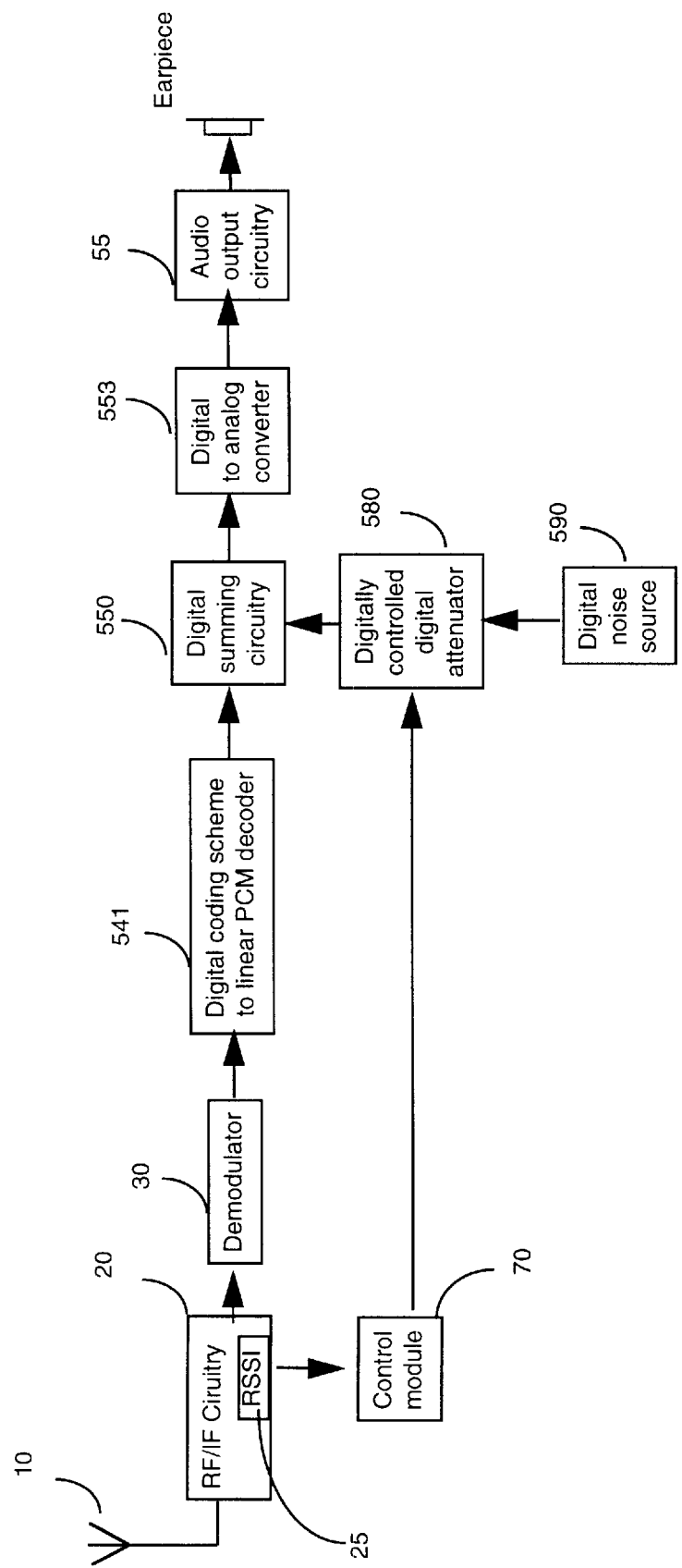
FIG. 6 is a block diagram illustrating an alternative embodiment of the invention.

FIG. 6 illustrates an alternative embodiment in which the received signal is not decoded initially, but rather, is decoded after a digital noise source is digitally inserted. In this embodiment, a digital noise source 590 is digitally attenuated by a digitally controlled digital attenuator 580, which receives control signals from the comparison and control module 70 in the same manner as FIG. 1. Other differences between the embodiment of FIG. 6 and the embodiment of FIG. 1 include the replacement of CODEC 40 with decoder 541, which converts the digitally encoded speech signal (in whatever coding scheme is used in the particular case) to linear (also known as uniform) pulse code modulation (PCM), i.e., where the quantization steps are all equal. The output from this decoder is then digitally combined with digital noise by the digital summing circuitry 550, and then converted to analog by a digital to analog converter 553. This alternative embodiment can be used conveniently in the base station, wherein, rather than converting the digital signal (including any added noise) to analog, the digital output is sent directly to the PSTN by means of suitable line interface circuitry.

In cellular, or cellular-like networks, communication is generally not lost as the RSSI decreases, but rather, the call is handed off to another channel with a signal which can be more clearly received by the mobile unit. In such circumstances, it would be undesirable to insert noise, as cellular systems attempt to make hand-off occur without any indication to the user. If the mobile unit is part of a cellular network, threshold 1 is preferably set below the threshold level for hand-off, so that hand-off occurs, if possible, before the RSSI decreases below threshold 1. In which case, the audible indication would only be provided if the RSSI has decreased below threshold 1, implying hand-off is not available.

Numerous modifications, variations and adaptations may be made to the particular embodiments of the invention described above without departing from the scope of the invention, which is defined in the claims.

What is claimed is:

1. A wireless unit for use in a digital wireless telecommunications system, said wireless unit comprising:

a digital receiver, said digital receiver including means for determining a parameter measuring the reception quality of a received digital signal;

a comparison and control module for evaluating whether said parameter satisfies a first criteria and a second criteria; and indicator means, responsive to said comparison and control means, for producing a user indication to a recipient of said received digital signal that the received digital signal has failed to satisfy said first criteria, said indicator means including variation means for varying the characteristics of said indication depending on how said parameter compares with said first criteria and with said second criteria.

2. A wireless unit as claimed in claim 1, wherein said indicator means includes means for generating an audible indication.

3. A wireless unit a claimed in claim 2, wherein said wireless unit is a base station connected to a telephone network, said base station further comprising a summing circuit for combining said audible indication with said received signal and means for sending the combined signal to the telephone network.

4. A wireless unit as claimed in claim 1, wherein said indicator means further comprises a noise source for generating noise; and wherein said variation means comprises an attenuator, responsive to said comparison and control means, for fully attenuating said noise while said parameter satisfies said first criteria and partially attenuating said noise if said parameter fails to satisfy said first criteria, the degree of attenuation decreasing as the parameter departs further from satisfying said first criteria, wherein the attenuator attenuates said noise pattern at a constant level once said parameter fails to satisfy said second criteria.

5. A wireless unit as claimed in claim 1, wherein said wireless unit is adapted to hand-off a call in progress to another channel if the parameter fails to satisfy a hand-off threshold, and wherein said parameter will fail to satisfy said hand-off threshold before said parameter will fail to satisfy said first criteria.

6. A wireless unit as claimed in claim 4, wherein said wireless unit is adapted to hand-off a call in progress to another channel if the parameter fails to satisfy a hand-off threshold, and wherein said parameter will fail to satisfy said hand-off threshold before said parameter will fail to satisfy said first criteria.

7. A method for providing an audible indication that a mobile digital wireless unit is moving out of communication range comprising the steps of:

a) receiving a digital signal at a receiving unit;

b) determining a parameter measuring the reception quality of said digital signal;

c) evaluating whether said parameter satisfies a first criteria;

d) evaluating whether said parameter satisfies a second criteria;

e) responsive to said parameter failing to satisfy said first criteria, providing an audible indication to a recipient of said received digital signal that the received digital signal has failed to satisfy said first criteria; and f) varying the audible characteristics of said audible indication depending on how said parameter compares with said first criteria and with said second criteria.

8. A method as claimed in claim 7, wherein said step of providing an indication comprises inserting a noise sample to said received signal, and wherein said varying step comprises the step of, responsive to said evaluating step, attenuating said noise in a series of steps as said parameter decreases from the level of said first criteria to the level of a second criteria.

* * * * *